(12) United States Patent
Zhao et al.

(10) Patent No.: US 10,860,245 B2
(45) Date of Patent: Dec. 8, 2020

(54) METHOD AND APPARATUS FOR OPTIMIZING DATA STORAGE BASED ON APPLICATION

(71) Applicant: EMC IP Holding Company LLC, Hopkinton, MA (US)

(72) Inventors: Junping Frank Zhao, Beijing (CN); Kun Wang, Beijing (CN); Yu Cao, Beijing (CN); Zhe Dong, Beijing (CN); Sanping Li, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 48 days.

(21) Appl. No.: 15/455,858

(22) Filed: Mar. 10, 2017

(65) Prior Publication Data

US 2017/0262232 A1    Sep. 14, 2017

(30) Foreign Application Priority Data

Mar. 11, 2016  (CN) .......................... 2016 1 0141381

(51) Int. Cl.
*G06F 3/06* (2006.01)
*H04L 29/08* (2006.01)
(Continued)

(52) U.S. Cl.
CPC .......... *G06F 3/0659* (2013.01); *G06F 3/0604* (2013.01); *G06F 3/0664* (2013.01);
(Continued)

(58) Field of Classification Search
CPC .... G06F 3/0659; G06F 3/0604; G06F 3/0664; G06F 12/08
See application file for complete search history.

(56) References Cited

U.S. PATENT DOCUMENTS 7,548,928 B1 *  6/2009  Dean ................. G06F 17/30985
8,595,268 B2 * 11/2013  Shoolman ......... G06F 17/30607
                                                                 707/803
(Continued)

FOREIGN PATENT DOCUMENTS

CN         104077380 A       10/2014
CN         104731794 A        6/2015

OTHER PUBLICATIONS

Chinese First Office Action issued in counterpart Application Serial No. 2019082400511690 dated Aug. 28, 2019.
(Continued)

*Primary Examiner* — Ryan Bertram
(74) *Attorney, Agent, or Firm* — Brian J. Colandreo; Mark H. Whittenberger; Holland & Knight LLP (57) ABSTRACT

Embodiments of the present disclosure propose a method and apparatus for optimizing storage of application data. The method comprises obtaining description information for application data from an application; performing storage optimization based on the description information; and performing at least pan of a storage function to be implemented by the back-end storage device, based on the description information before transmitting application data to the back-end storage device. With the method or apparatus according to the embodiments of the present disclosure, an efficient manner of integrating the application and non-volatile storage device is provided to coordinate the application and storage, thereby improving efficiency and expanding capability.

22 Claims, 8 Drawing Sheets

(51) Int. Cl.
  *G06F 12/14* (2006.01)
  *H04L 29/06* (2006.01)
  *G06F 16/22* (2019.01)
  *G06F 12/0868* (2016.01)

(52) U.S. Cl.
  CPC ...... *G06F 12/0868* (2013.01); *G06F 12/1408* (2013.01); *G06F 16/2282* (2019.01); *H04L 67/10* (2013.01); *H04L 67/42* (2013.01); *H04L 69/04* (2013.01); *G06F 2212/1016* (2013.01); *G06F 2212/1044* (2013.01); *G06F 2212/154* (2013.01); *G06F 2212/163* (2013.01); *G06F 2212/401* (2013.01)

(56) References Cited

U.S. PATENT DOCUMENTS

| | | | | |
|---|---|---|---|---|
| 8,601,473 B1* | 12/2013 | Aron | ............... | G06F 9/45533 718/1 |
| 9,426,219 B1* | 8/2016 | Keyser | ............... | H04L 67/1097 |
| 9,519,486 B1* | 12/2016 | Blott | ............... | G06F 9/3867 |
| 2004/0039889 A1* | 2/2004 | Elder | ............... | G06F 11/2071 711/162 |
| 2006/0294234 A1* | 12/2006 | Bakke | ............... | H04L 69/16 709/225 |
| 2010/0223244 A1* | 9/2010 | Sinha | ............... | G06Q 10/00 707/705 |
| 2013/0007180 A1* | 1/2013 | Talpey | ............... | G06F 3/0656 709/212 |
| 2013/0086303 A1* | 4/2013 | Ludwig | ............... | G06F 21/00 711/103 |
| 2013/0226931 A1* | 8/2013 | Hazel | ............... | G06F 16/134 707/741 |
| 2014/0149794 A1* | 5/2014 | Shetty | ............... | H04L 67/1095 714/20 |
| 2014/0359144 A1* | 12/2014 | Kruse | ............... | H04L 29/06197 709/228 |
| 2016/0070474 A1* | 3/2016 | Yu | ............... | G06F 3/0608 711/103 |
| 2016/0077980 A1* | 3/2016 | Tomlin | ............... | G06F 17/30286 711/135 |
| 2016/0112722 A1* | 4/2016 | Rowny | ............... | H04N 9/04 348/231.2 |
| 2016/0147800 A1* | 5/2016 | Huang | ............... | G06F 12/0813 707/692 |
| 2017/0139596 A1* | 5/2017 | Hack | ............... | G06F 3/064 |

OTHER PUBLICATIONS

Second Chinese Office Action issued in CN Application No. 2016101418432 dated Feb. 26, 2020.

* cited by examiner

METHOD AND APPARATUS FOR OPTIMIZING DATA STORAGE BASED ON APPLICATION

RELATED APPLICATIONS

This application claim priority from Chinese Patent Application Number CN 201610141381.4, filed on Mar. 11, 2016 at the State Intellectual Property Office, China, titled "METHOD AND APPARATUS FOR DATA STORAGE BASED ON APPLICATION OPTIMIZATION" the contents of which is herein incorporated by reference in its entirety

FIELD

Embodiments of the present disclosure relate to a storage system and more particularly relate to a method and an apparatus for optimizing storage of application data.

BACKGROUND

Currently, the third generation storage platform (P3) application, including, for instance, cloud computing, big data, mobile and social, etc. is attracting keen interest of people. The third generation platform application generally requires non-relational database (NoSQL) as a backbone application. It is predicted that NoSQL will grow at 26% compound annual growth rate (CAGR) by 2020. As a kind of NoSQL, key-value (K-V) database is usually used for high-speed cache and metadata, etc. and is characterized by high-speed and non-memory intensive.

NoSQL database (e.g. K-V) is mainly spurred by the internet and possesses advantages in flexibility, no predefined module, capability of horizontal expansion, final consistency, multiple duplicates and high speed. However, NoSQL application with a memory centric architecture runs usually in the memory, which results in the following defects:

First, its scalability is at present limited to the capacity of the memory and causes high costs;

Second, due to time delay or data loss at downtime and warmup at restart of the memory, performance of the application may be inconsistent;

Therefore, at present, attempts have been made to run the application in non-volatile storage, such as flash memory. For example, some vendors seek to adapt the application for use in a flash memory by making some changes to the application. However, the technology is immature at present and the performance is still not validated. Moreover, it is undesirable to make too much change to the application.

Currently, there are many flash memory products available on the market. They present usually in the form of a hardware box equipped with various interfaces and functions. However, an efficient manner of integrating non-volatile storage (e.g. flash memory) and an application is still not available.

Embodiments of the present disclosure provide methods and apparatus to solve at least some of the above mentioned problems.

SUMMARY

Embodiments of the present disclosure provide methods and apparatus for data storage in a storage system. A brief summary of the embodiments is given below to provide basic understanding of some aspects of various embodiments. The summary is not intended to indicate essentials of the key elements or describe the scope of various embodiments. Its sole purpose lies in presenting some concepts in a simplified form to serve as the preamble for the following more detailed description.

A first aspect of the present disclosure provides a method for data storage, the method comprising: obtaining description information for application data from an application; performing storage optimization based on the description information; and performing, at least part of a storage function to be implemented by an back-end storage device, based on the description information before sending the application data to the back-end storage device.

In an embodiment, the description information may include at least one of the following: information about whether the application data is hot data or cold data; information about whether the application data is meta data, information about whether the application data can be compressed or information about whether repetitive data can be deleted from the application data, information about whether the application data is a data snapshot, information about whether the application data has expired, or information about whether the application data is garbage data.

In another embodiment, obtaining description information for application data from an application may include: obtaining the description information by querying the application program interface (API) of the application, and/or by receiving an in-/output request from the application.

In still another embodiment, performing storage optimization may include performing at least one of the following: writing combining, pre-reading, non-uniform memory access (NUMA), reducing memory copies by executing in place (XIP) or zero copy, prioritizing, and reading or writing caching.

In an embodiment, at least part of a storage function to be implemented by the back-end storage device may include at least one of the following: obtaining an abstract of the application data with security hash algorithm (SHA); deleting a repetition; compressing the application data; partitioning the application data and determining a target storage device to which the application data is to be transmitted; and transmitting the application data to the target storage device via Remote Direct Memory Access (RDMA).

In another embodiment, the method may further comprise: transmitting the application data to the back-end storage device after performing at least part of the storage function to be implemented by the back-end storage device. In still another embodiment, transmitting the application data to the back-end storage device comprises transmitting the application data to the back-end storage device via a network.

In some embodiments, the back-end storage device may be non-volatile storage device.

As an example, the application may include at least one of the following: Relational Database SQLDB, non-Relational Database NoSQL, File system (FS) and Virtual Machine (VM).

In some embodiments, the method may further comprise performing at least one of the following management operations: monitoring the data storage, reporting a state of data storage; and managing a path for the data storage.

In some other embodiments, the method is implemented in a server running the application.

A second aspect of the present disclosure provides an apparatus for data storage, comprising: an application integrating unit configured to obtain description information for application data from an application; a storage optimizing unit configured to perform storage optimization based on the description information; and a storage function coordinating unit configured to perform, at least part of storage functions to be implemented by an back-end storage device, based on the description information before transmitting the application data to the back-end storage device.

In an embodiment, the apparatus may further comprise: a transmitting unit configured to transmit the application data to the back-end storage device after performing at least some of the storage functions to be implemented by the back-end storage device.

In another embodiment, the apparatus may further comprise a managing unit configured to perform at least one of the following management operations: monitoring the data storage, reporting a state of data storage; and managing a path for the data storage.

A third aspect of the present disclosure provides an application server comprising an application and the apparatus according to the second aspect of the present disclosure.

A fourth aspect of the present disclosure provides an apparatus comprising at least one processor; and at least one memory comprising computer program code, wherein the at least one memory and the computer program code are configured, with at least one processor, to cause the apparatus to implement a method according to the first aspect of the present disclosure.

A fifth aspect of the present disclosure provides a computer program comprising instructions which, when implemented in at least one processor, cause the at least one processor to implement a method according to the first aspect of the present disclosure.

The method or apparatus according to the embodiments of the present disclosure can provide an efficient manner of integrating the application and the non-volatile storage device, thus coordinating the application and the storage device, improving efficiency and scalability, and/or lowering total cost of ownership (TCO).

Though specific embodiments are illustrated in the drawings by way of example, it should be understood that description of detailed embodiments is not intended to limit the embodiments as the exact form disclosed.

BRIEF DESCRIPTION OF THE DRAWINGS

Objectives, advantages and other features of the present disclosure will become more apparent in the following disclosure and claims. Example embodiments are described hereby in a non-limiting manner, for the sole purpose of illustration, with reference to accompanying drawings, in which:

DETAILED DESCRIPTION OF EMBODIMENTS

In the following description, many details are described for the purpose of illustration. However, those skilled in the art would realize that the embodiments of the present disclosure may be implemented without using these specific details. Therefore, the present disclosure is not intended to be limited by the embodiments shown here but will be invested with the broadest scope consistent with the principles and features described herein.

It should be appreciated that terms "first", "second", etc. are only used to distinguish one element from another. As a matter of fact, a first element can also be called a second element and vice versa. It should also be appreciated that "comprising" and "including" are only used to indicate the presence of the illustrated features, elements, functions or components without excluding the presence of one or more other features, elements, functions or components.

Figure 1A:
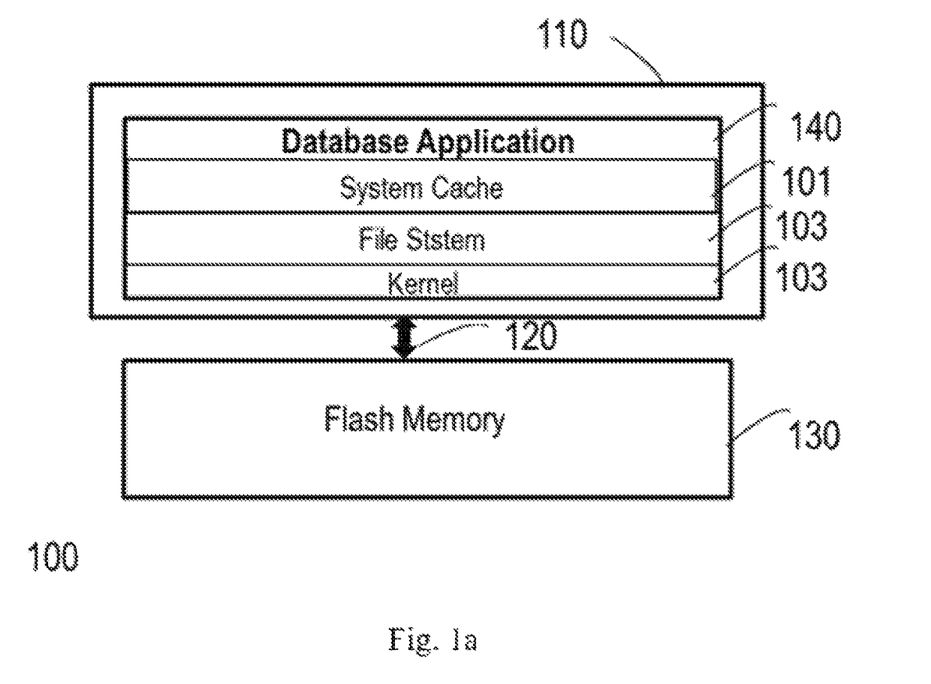
FIGS. 1a-1b show schematic diagrams of the manner of combining the application and the storage device in the prior art.

As stated above, currently there is no effective solution for running an application of P3 in flash memory. For example, currently the application and the flash memory are combined in a manner of loose coupling, namely, the flash memory and the application are substantially independent, as shown by a structure 100 in FIG. 1a. At an application server 110, the application data need to go through multiple layers (e.g. system cache 101, file system 102 and kernel 103, etc.) and is subject to some processing at each layer, which causes long time delay and low-efficiency. Moreover, application data should then be transmitted to flash memory 130 through network 120, hence further lengthening data path and causing extra time delay. Additively, as shown by the structure in FIG. 1a, there is no effective coordinative optimization between the application 140 (e.g. K-V database application) and flash memory storage device 130 (e.g. EMC™ full flash memory array XtremIO block), and as a results, the flash memory storage device 130 is not aware of the feature of application data of the application 140. Consequently, corresponding optimization for the feature cannot be performed and data storage efficiency is low.

Figure 1B:
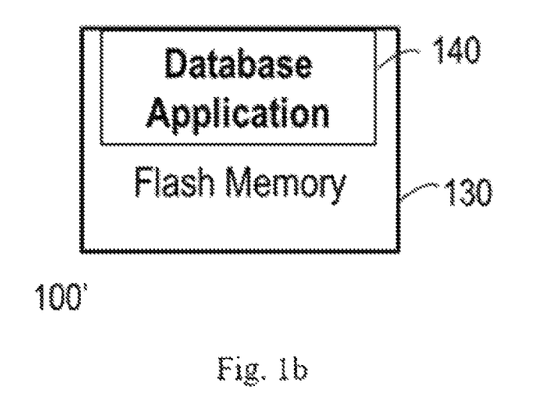

As an alternative solution, attempts have been made to couple the application and the flash memory closely. For example, one approach is to simply integrate the application 140 (e.g. K-V database application) into the flash memory 130 and package them into a container, as shown by the structure 100' in FIG. 1b. However, this solution does not differ substantially from loose coupling except in omitting the part of transmitting through network 120; while in the packaged container, the application and the storage device still run independently and data will still be processed through a plurality of layers; the problem of delay and efficiency would still exist. Furthermore, this structure would also lead to other problems. For instance, in this case, competition about memory/CPU resources would be fierce, which requires a more complicated managing mechanism, hence increasing the cost for management. Moreover, costs for orchestration, maintaining and scaling of the structure are high. For example, a large amount of abstraction and resource investment will be required to support expansion from one KV to another.

To solve at least some of the above problems, embodiments of the present disclosure provide a more efficient method and apparatus for data storage.

Though for purpose of illustration, principles of the method or apparatus of the present disclosure are described with NoSQL (e.g. K-V) application and flash memory storage device as an example in some embodiments, as can be understood by those skilled in the art, embodiments of the present disclosure are not limited to the example configuration but can be applied to other scenarios where similar problems exist and/or scenarios that could benefit from the principle.

Embodiments of the present disclosure can be embodied in an intelligent client or lib to reduce or simplify the software stack and expenses of the application host side. Some embodiments can offload or coordinate storage tasks so that the processing can be more efficient. Some other embodiments can reduce TCO and lengthen life cycle of flash memory/non-volatile storage device. In still some other embodiments, the client according to embodiments of the present disclosure can be packaged into a container together with the application and run together with a storage device container. Additively, embodiments of the present disclosure create small changes to both application logic and storage device sides.

Figure 2:
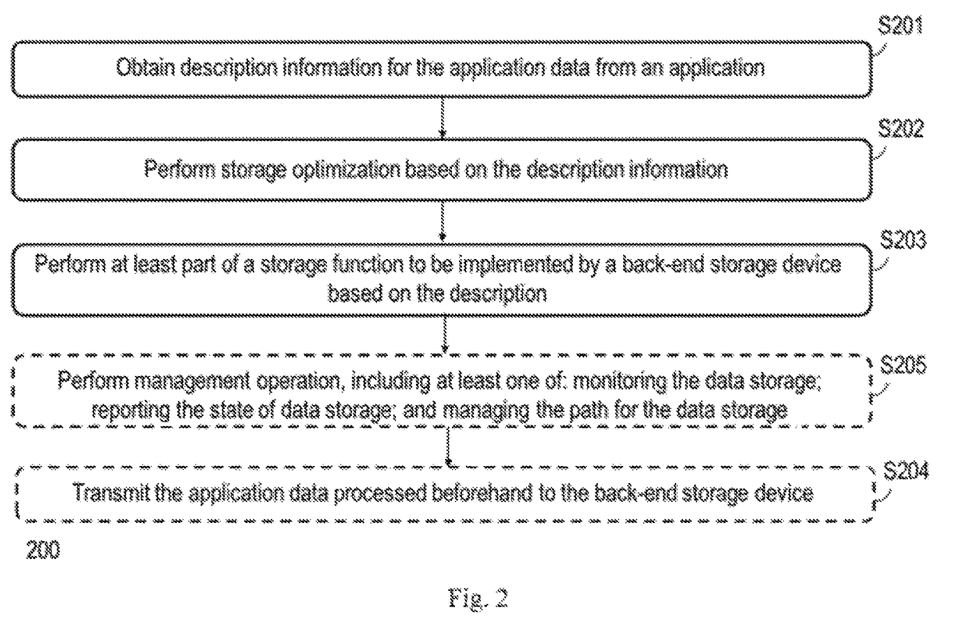
FIG. 2 shows an example flow chart of a method for data storage.

FIG. 2 shows an example flow chart of method 200 for data storage. The method may be implemented at a client of the application server (e.g. 110 in FIG. 1a) so that the server can be used as a bridge between the application and the storage device. But embodiments of the present disclosure are not limited hereto.

As shown in FIG. 2, the method 200 comprises: at block S201, obtaining description information for the application data from an application; at block S202, performing storage optimization based on the description information; and performing at block S203 at least some of a storage function to be implemented by a back-end storage device based on the description information before sending application data to the back-end storage device.

In the method 200, description information for the application data can be obtained via communication between the client and the application. The description information is further used to perform optimization processing and coordination of storage functions, thus lowering processing time delay, shortening path of at least some of the processing and improving processing efficiency.

In an embodiment, the description information may include (but not limited to) at least one of the following: information about whether the application data is hot data or cold data; information about whether the application data is meta data, information about whether the application data can be compressed or repetitive data can be deleted from it, information about whether the application data is data snapshot, information about whether the application data has expired, or information about whether the application data is garbage data.

For example, in an embodiment, at S201, the description information may be obtained by querying the application program interface (API) of the application. With the description information, storage optimization may be performed to improve storage efficiency. For example, hot data and cold data may be processed differently, and/or, data expired or garbage data may be discarded and corresponding storage spaces may be retrieved. In another embodiment, at S201, the description information may be obtained by receiving input/output (IO) requests from the application. For instance, the description information may be included in IO requests as a tag.

Storage optimization operation implemented at S202 may be different depending on the obtained description information. For example, the storage optimization may include implementing at least one of the following: writing combining, pre-reading, non-uniform memory access (NUMA), reducing memory copy by implementing execution In Place (XIP) or zero copy, prioritizing, and reading or writing cache. Some processing functions may be omitted for some optimization operations, thus shortening the path and some other operations (e.g. writing combining) may lengthen IO life span.

Alternatively or in addition, the at least some of the storage functions to be implemented by a back-end storage device but performed in advance in S203 comprise at least one of the following: obtaining abstract of the application data with a security hash algorithm (SHA); performing repetition deleting; compressing the application data; partitioning the application data and determining a target storage device to which the application data is transmitted; and transmitting the application data to the target storage device via RDMA, wherein obtaining abstract of the data facilitates determining whether repetitive data exist, such that repetition deleting can be performed on this basis. The compressing operation can reduce the amount of data transmitted over network. Moreover, operation may be performed selectively for certain application data based on the description information of the application data obtained at S201. For example, if the data is metadata, then compressing operation at S203 may be omitted. For another example, if the application data have been compressed, then compressing operation at S203 may also be omitted.

In an embodiment, the back-end storage device may be a non-volatile storage device, such as, but not limited to, all flash memory storage device, hybrid flash memory storage device, and storage device optimized for non-volatile storage device/flash memory. In another embodiment, the method is implemented in an application server which can access the back-end storage device via network.

In the prior art, application data may be transmitted to any memory box in the back-end storage device via network and further transmitted to the target memory via the memory box. In an embodiment of the present disclosure, data partition may be implemented beforehand, and the final target memory of application data may be determine, so that the application data can be transmitted to the target memory directly, thus a forwarding operation implemented in the back-end storage device may be omitted. In another embodiment, at S203, application data can be transmitted to the final target memory via Remote Direct Memory Access (RDMA).

RDMA is mainly used to reduce delay of end data processing during data transmission, thereby reducing costs of host CPU. RDMA can be realized by, for instance, RMDA Over Converged Ethernet (RoCE), InfiniBand and iWARP. The working process of RDMA may include: 1) when an application performs RDMA reading or writing request, RDMA requests are transmitted from the application running in the user space to the network interface card (NIC) without any involvement of any kernel memory: 2) NIC reads buffered contents and transmits them to the local NIC via network; 3) RDMA information transmitted over the network comprises addressing information (which is metadata, including, e.g. target virtual address and memory index) and data per se. RDMA operation enables the application to read data from a memory of a remote application or to write data into the memory; 4) target NIC confirms the address index and writes data directly into an application buffer.

As stated above, by performing some storage functions/services in advance, end-to-end performance may be optimized and changes to the back-end storage device can be minimized.

Method 200 may be implemented in a client or lib of an application server so that the server or lib acts as a bridge between the application and the storage product, namely, the application can access the storage function via the client or lib to optimize end-to-end performance.

In an embodiment, method 200 may further comprise S204, wherein the application data that have been processed beforehand in S203 are transmitted to the back-end storage device. In another embodiment, transmitting the application data to the back-end storage device comprises transmitting the application data to the back-end storage device via network. Embodiments of the present disclosure are not limited to any specific network and only as an example, the network can be internet.

Though in some embodiments of the present disclosure, principles of the present disclosure are illustrated with the example of NoSQL application, embodiments of the present disclosure are not limited to the specific example. Just as an example, the application involved in method 200 can be (but not limited to) SQLDB, FS and VM, etc., wherein examples for the NoSQL can be K-V database and Column database.

Alternatively or in addition, in some embodiments, method 200 may further comprise: at block S205, performing management operation which may include (but not limited to) at least one of: monitoring the data storage; reporting the state of data storage; and managing the path for the data storage.

A schematic structural diagram of an apparatus 300 for data storage is described with reference to FIGS. 3a-3c. Apparatus 300 may be located in an application server that runs the application, and serve as a bridge for communication between the application and the storage device. By making use of information on the application data, the apparatus can improve data storage processing efficiency. In some embodiments, the application can include (but not limited to) one of the following: SQLDB, NoSQL, FS and VM, etc., wherein examples of the NoSQL can be K-V database or Column database.

Apparatus 300 can implement method 200 as shown in FIG. 2 but is not limited to implementing the method 200. Likewise, the method 200 may be implemented by apparatus 300 but is not limited to being implemented by apparatus 300. For example, at least some operations of method 200 can be implemented by other apparatuses.

Figure 3A:
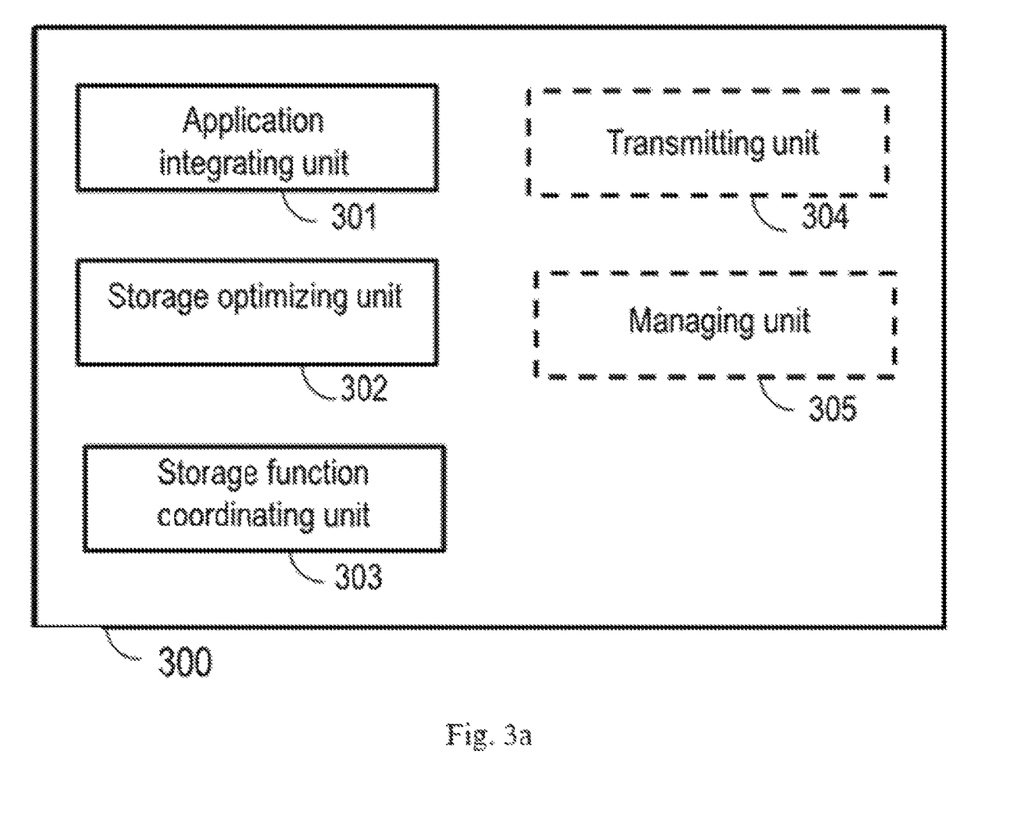
FIGS. 3a-3c show an example structural diagram of an apparatus for data storage.

As shown in FIG. 3a, apparatus 300 comprises an application integrating unit 301 configured to obtain description information for the application data; a storage optimizing unit 302 configured to perform storage optimization based on the description information; and a storage function coordinating unit 303 configured to implement at least some of the storage functions to be implemented by the back-end storage device in advance based on the description information before transmitting the application data to the back-end storage device.

In an embodiment, application integrating unit 301 may comprise an expandable API set which enables to obtain description information from various applications of upper layer. Obtaining the description information can facilitate the follow-up modules of the method performing efficient, rapid and targeted processing. As described with reference to FIG. 2, in an embodiment, description information of the application data may include but is not limited to at least one of the following: information about whether the application data is hot data or cold data; information about whether the application data is meta data, information about whether the application data can be compressed or the repetitive data can be deleted from it, information about whether the application data is data snapshot, whether the application data has expired, or information about whether the application data is garbage data. It enables the storage optimizing unit 302 to determine the optimization processing for a specific data type based on the description information gathered/obtained by the application layer and to achieve more efficient coupling of the application and the storage function.

For example, description information may indicate which data are metadata of the application. Due to more stringent requirement on performance and reliability, etc., configurably, metadata may be given a higher IO priority or be exempted from experiencing some functions such as compressing and deleting repetition data, etc. In another embodiment, description information obtained by application integrating unit 301 may indicate which data are cold data. Upper layer applications usually maintain least recently used (LRU) statistics of cold data. Cold data may be processed beforehand but with a lower priority of operation. In still another embodiment, description information may indicate which data are snapshot data. Snapshot data may not be accessed during a short period and therefore can be processed beforehand. In another embodiment, description information may indicate which data are expired data. Application (e.g. K-V) allows the user to set a time limit and scans periodically to detect the expired data which would be retrieved quickly after being obtained by the application integrating unit 301.

In an embodiment, application integrating unit 301 may, for example, gather description information about a feature of data from the application by querying API of the application, which may be automatically performed, periodically or irregularly. In another embodiment, IO started by upper layer applications may be tagged to provide the description information. In still another embodiment, the above two methods may be combined in use. For example, application integrating unit 301 may query the application proactively to learn which are cold data and which are expired data, and meanwhile, it may be informed passively which data are metadata and/or data snapshot.

In another embodiment, storage optimizing unit 302 may be configured to perform at least one of: writing combining, pre-reading, non-uniform memory access (NUMA), reducing memory copy by implementing XIP or zero copy, prioritizing, and reading or writing cache.

In an embodiment, storage optimizing unit 302 may be configured as flash memory high-performance IO processing module which can be used to reduce common software processing expenses, such as lock, CPU switch, user space-kernel space in and out, data copying for plural times, etc. The main module of the storage optimizing unit 302 can run in user space.

Figure 3B:
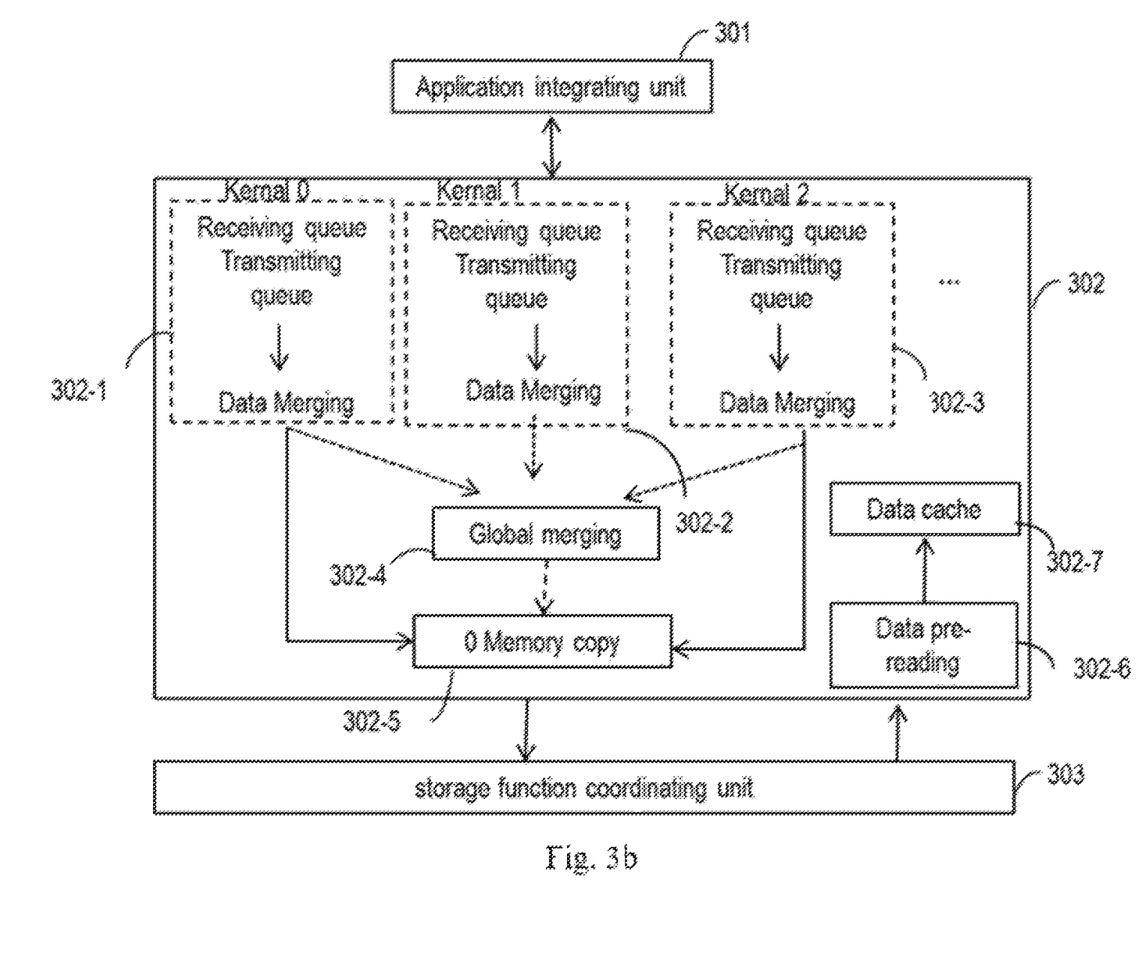

FIG. 3b shows a schematic diagram of connections between the storage optimizing unit 302 and other modules and example operations inside the storage optimizing unit 302. As shown in FIG. 3b, storage optimizing unit 302 may be configured to establish a receiving and transmitting queue (302-1, 302-2, 302-3) for each CPU-core and perform data merging on each core, for instance, based on data address offset. In another embodiment, storage optimizing unit 302 may be configured to merge data on multiple cores globally before IO (302-4). In still another embodiment, storage optimizing unit 302 may be configured to transmit IO to the lower layer, wherein memory copy (302-5) is reduced or avoided within the storage optimizing unit 302 and cache layer of the kernel is bypassed with RDMA technology, or Linux UIO, DAX technology etc. Alternatively, storage optimizing unit 302 may be configured to read data into the in-built cache module 302-7 beforehand according to an access module and tendency with, for instance, the backstage pre-reading module 302-6.

Alternatively or in addition, in an embodiment, storage functions to be implemented at least in part by the back-end storage device and performed in advance by storage function coordinating unit 303 may comprise at least one of: obtaining abstract of the application data with SHA; performing repetition deleting; compressing the application data; partitioning the application data and determining a target storage device to which the application data is to be transmitted; and transmitting the application data to the target storage device with RDMA.

SHA is a typical data abstract algorithm. For example, an implementation of SHA, SHA1, may generate an information abstract of 160 bits which can be used as data signature, based on content of the input data. It mainly functions as an abstract in the embodiments of the present disclosure. The probability for two sections of data with the same abstract to have identical content (being repetitive) is very high. Therefore, the algorithm can be used to determine whether to perform repetition deleting.

In an embodiment, storage function coordinating unit 303 may be configured to optimize or pre-process specifically for what actually stored in the back-end of flash memory and metadata obtained by application integrating unit 301. Examples for the operation are shown in FIG. 3c. As indicated in FIG. 3c, it can be configured to: compute (303-1) abstract of IO data (310) with, for example, SHA algorithm so as to delete repetitive data for the purpose of eliminating redundant data, decrease amount of actual data writing, enhance writing performance and reduce flash/magnetic disk losses. In another embodiment, storage function coordinating unit 303 may be configured to perform data compressing (303-2) with, for example, common algorithms, such as Gzip, Lz4 and Lzs algorithm, etc. It should be noted that the above operations can be configured to be activated or deactivated specifically based on description information obtained by application integrating unit 301 and system configuration. For instance, for the sake of performance, meta data may be exempted with the above operations.

In another embodiment, storage function coordinating unit 303 may be configured to generate a check code with, for instance, CRC64 algorithm and save (303-3) it, to ensure data integrity. In a further embodiment, storage function coordinating unit 303 may be configured to implement any one of:
encrypting data (303-4), wherein the key can be configured beforehand. For example, the whole disk/volume shares one key;
partitioning data (303-5): distributing data to a plurality of storage nodes according to a rule of implementation, for instance, according to content (represented with abstract) or offset of data. Data partitioning is recommended to be in consistent with the back-end storage cluster, namely, rules of distributing for the back end storage are moved forward to run at the server end, for the application scenario where the back-end is a flash cluster, in view of possible dynamic addition/decrease (e.g. maintenance, capacity expanding, anomaly) of the node, the back-end flash cluster may inform the change of the nodes to the server in an asynchronized (303-6, 303-7) manner to keep the partitions consistent;
storing all the metadata in the flash memory and/or interacting in a manner of query-answer (303-8). For example, maybe only the abstract of the data are computed, and then abstract information of a plurality of data is transmitting in a batch to the flash storage cluster which queries the overall abstract lib and then returns non-repetitive abstract information therein to the server; the server may only transmit these non-repetitive data accordingly;
transmitting data (303-9): non-repetitive data are transmitted directly from the server to the storage nodes (320) according to partitioning rules, optionally in the manner of RDMA; the storage node may be a shared flash storage cluster expanding horizontally.
another case is that the flash storage is not shared but flash memory inbuilt in each server, and a plurality of servers work peer to peer in coordination. Then data can be stored in the server locally. Alternatively, to improve reliability, one or more duplicates can be transmitted to another server (303-A).

As described above in conjunction with method 200, the back-end storage device may be (but not limited to) a non-volatile storage device. In an embodiment, the apparatus 300 may further comprise: a transmitting unit 304 configured to transmit the application data that have been processed beforehand by storage function coordinating unit 303 to the back-end storage device. In another embodiment, the transmitting unit 304 may further be configured to transmit the application data to the back-end storage device via network. Embodiments of the present disclosure are not limited to any specific form of network, for instance, the network may be internet.

Alternatively or in addition, in an embodiment, apparatus 300 may further comprise a managing unit 305 configured to perform management operation which may comprise (but not limited to) at least one of the following: monitoring the data storage, reporting a state of data storage; and performing path management for the data storage.

Figure 4:
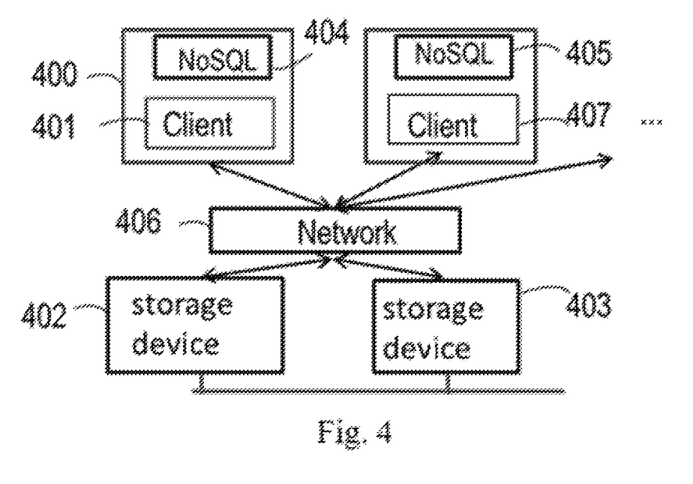
FIG. 4 shows a schematic diagram of implementing a method/apparatus of an embodiment of the present disclosure in a server.

As shown in FIG. 4, the apparatus according to an embodiment of the present disclosure may be embodied in a client/lib/driver (e.g. client 401 or 407) running in application node 400 (e.g. application server) so that the application node can coordinate with the storage system (e.g. storage device 402, 403) and connect the storage device and application effectively (e.g. NoSQL 404, 405). The application server can be connected to the storage device via, for instance, network 406.

Apparatus (implemented as client 401 or 407, or a part thereof) according to an embodiment of the present disclosure shown in FIG. 4 may adopt a hierarchical design, as described with reference to FIGS. 3a-3c. For instance, various network connections may be processed by low layer drivers which may comprise at least part of functions of the storage function coordinating unit 303. In another example, visible interfaces and API are handled by high layer drivers which may comprise at least part of functions of application integrating unit 301, storage optimizing unit 302 and storage function coordinating unit 303 shown in FIGS. 3a-3c, for instance.

Apparatus according to another embodiment of the present disclosure can be divided into a control module and a data path module, wherein the control module may be (or include) the managing unit 305 shown in FIG. 3a which can be configured to perform device discovering, authenticating, configuring, outputting, monitoring and high availability (HA) functions. Data path module can be of a hierarchical structure and enables to bypass file system (FS)/system cache where necessary to reduce context switching/system scheduling. For instance, it can be configured to cause a part of functions operates in a user state instead of a kernel state, thus reducing costs. In some embodiments, the data path module may comprise at least part of functions of application integrating unit 301, storage optimizing unit 302 and storage function coordinating unit 303 shown in FIGS. 3a-3c, for instance.

As stated above in conjunction with apparatus 300, the application integrating unit 301 may obtain information from the application layer for proactive load/asynchronization removal; and/or gathering garbage data distribution information, to retrieve corresponding flash memory space; and/or may perform writing combining or perform check point at the memory side. Storage optimizing unit 302 may be configured for optimizing common flash memory/non-volatile storage device. It may perform small writing operations in a batch and pre-load data, etc. based on information from the application integrating layer 301; and/or reduce data copy from the user space to the device by omitting file system/webpage cache via Execute-In-Place (XIP) or Direct Access (DAX); and/or keep necessary data/metadata. The storage optimizing unit 302 enables data cache to be written through, such that data are persistent and efficient for the flash memory array. Storage function coordinating unit 303 can be used for optimizing flash memory array, for example, may be used for offloading tasks from the back-end storage device, or for host assisted repetition deleting/compressing of data; and for verification and generation, etc. K-V application is memory intensive instead of CPU intensive and data repetition deletion can help eliminate traffic of repetitive values to the array. Moreover, storage function coordinating unit 303 can relieve compression challenges inflicted on the back-end device. For example, when the data block is not large enough or unfit for compressing or has been compressed, the back-end storage device may perform unnecessary compressing processing to it, if it is unaware of data features, while storage function coordinating unit 303 can advance the compressing function and avoid unnecessary operations using data description information from the application. Moreover, as stated above, storage function coordinating unit 303 can further perform partition function. With SHA footprint, application can communicate with a specific storage node directly, thereby eliminating a hop and shortening processing time delay. As for the case of expanding array cluster, storage function coordinating unit 303 can duplicate data in advance and distribute it to other hosts directly. In an embodiment, data may be transmitted between the application and the array via RDMA. The operation can be supported by IB, internet small computer system interface (ISCSI, iSER) or even the internet, thus reducing usage and processing time delay of the CPU.

In another embodiment of the present disclosure, there is provided an application server, such as the application server 400 shown in FIG. 4. The application server comprises an application and any of the apparatuses shown in FIGS. 3a-3c.

Figure 3C:
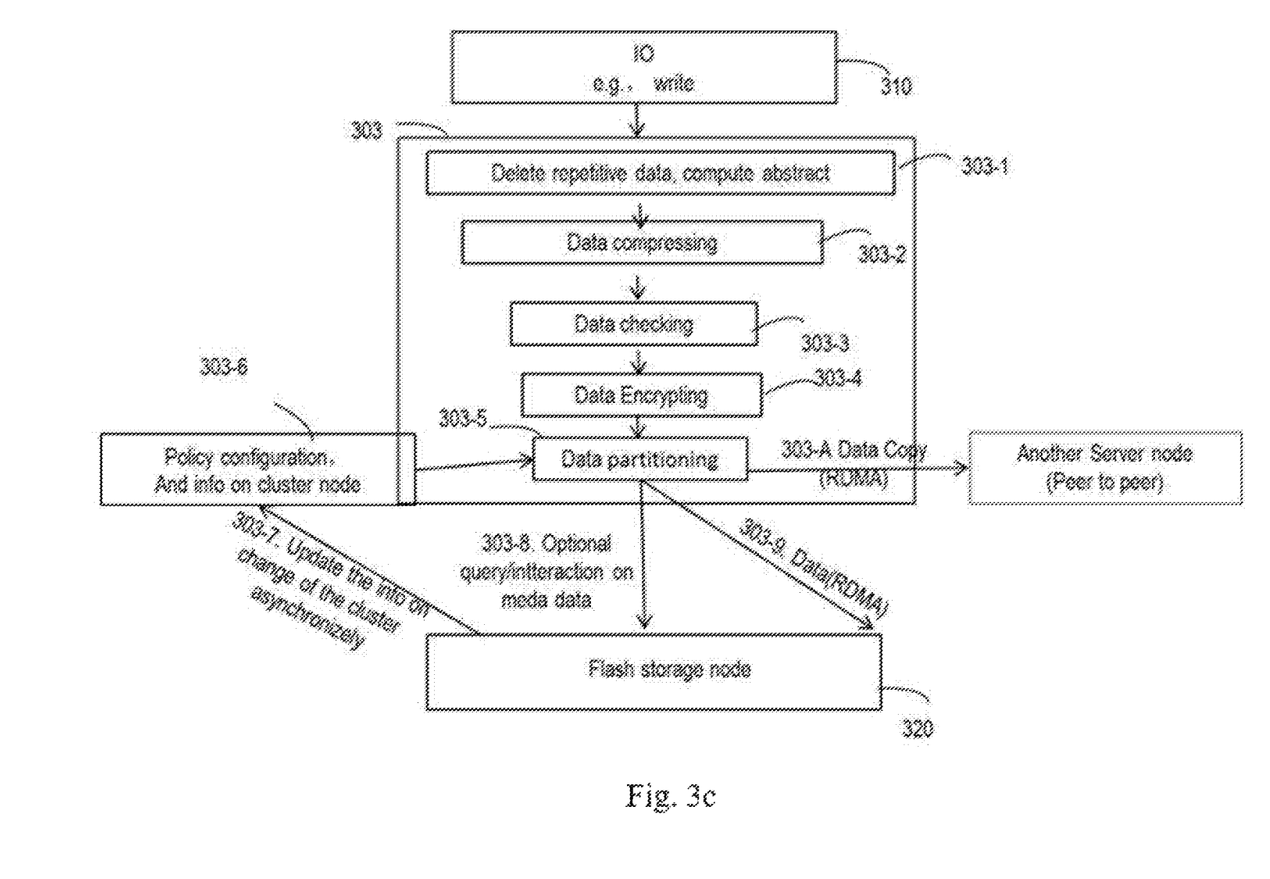

As can be understood by those skilled in the art, apparatus 300 and server 400 may include other units that are not shown in FIGS. 3a-4; and/or in some embodiments, some units in FIGS. 3a-4 can be omitted.

Before the apparatus and device according to the embodiments of the present disclosure are proposed, there is no effective way for integrating the application and non-volatile storage device. Embodiments of the present disclosure provide methods and apparatuses for enabling communication between the application and the storage device and coordination of storage functions.

Those skilled in the art would realize readily that the blocks or operations of the methods proposed above can be implemented with a programmed computer. In the present disclosure, some embodiments also intend to the cover a computer program comprising instructions which when being executed in at least one processor, causes the at least one processor to perform any of methods 200. In the present disclosure, some embodiments also intend to cover a program storage system, for instance, a digital data storage medium which includes program instructions which are machine or computer readable, and executable by coded machine or computer, wherein the instructions implement some or all of the operations of method 200. The program storage system may be, for instance, digital memory, magnetic storage medium such as disks and tape, hardware driver or optical readable digital data storage medium. The embodiment also intends to cover a computer programmed to implement the above method. Some embodiments also intend to cover an apparatus comprising at least one processor and at least one memory which comprises computer program codes, wherein the at least one memory and the computer program codes are configured, with the at least processor, to cause the apparatus to perform method 200.

Figure 5:
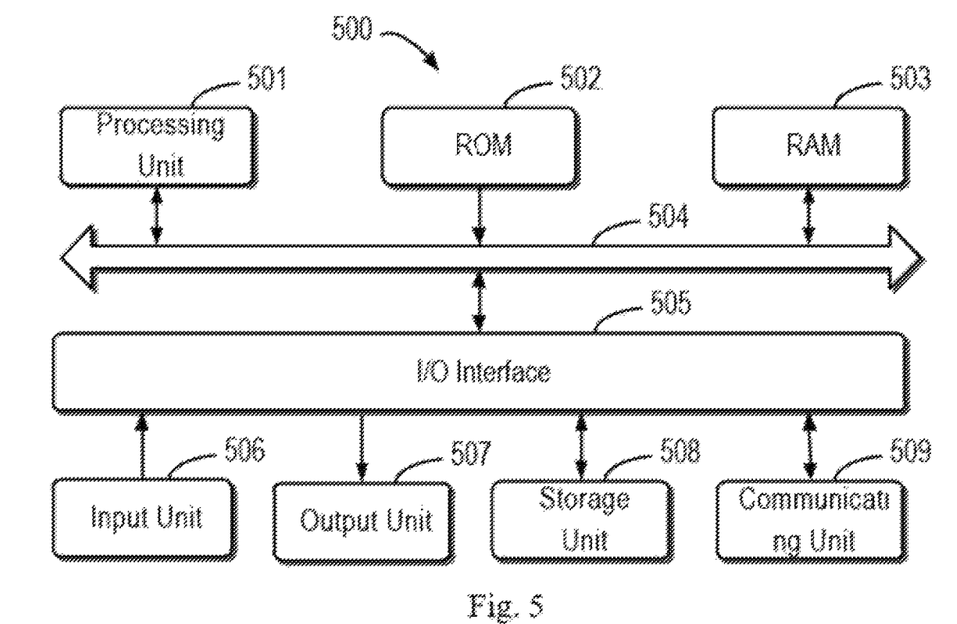
FIG. 5 shows an example block diagram of an apparatus that can be used to implement an embodiment of the present disclosure.

FIG. 5 shows an schematic block diagram of the apparatus 500 that can be used to implement embodiments of the present disclosure. As shown in the figure, apparatus 500 comprises a processing unit (e.g. but not limited to CPU) 501 which can perform various proper actions and processing according to computer program instructions stored in read-only-memory (ROM) 502 or from storage unit 508 (e.g., computer program instructions loaded from storage unit 508 to the random access memory (RAM) 503). In RAM 503, various programs and data required for operation of apparatus 500 may also be stored. Processing unit 501, ROM 502 and RAM 503 are connected with each other via bus 504, and in-/output (IO) interface 505 is also connected to bus 504.

A plurality of components in apparatus 500 are connected to I/O interface 505 and the components include: input unit 506, such as keyboard and mouse; output unit 507, such as display and loudspeaker of various types; storage unit 508, such as disk or compact disk, etc.; and a communicating unit 509, such as network card, modem or wireless communication transceiver, etc. Communicating unit 509 allows the apparatus 500 to communicate information/data with other devices via computer network such as internet and/or various telecommunication networks.

All the processes and processing described above, such as method 200, can be implemented by the processing unit 501. For example, in some embodiments, method 200 can be implemented as a computer software program which is tangibly incorporated in the machine readable medium, such as a storage unit 508. In some embodiments, a part or all of a computer program can be loaded to and/or installed in apparatus 500 via ROM 502 and/or communicating unit 509. When loaded to RAM 503 and implemented by the processing unit 501, the computer program can implement one or more of the operations of method 200 described above.

Therefore, solutions of the present disclosure may be provided in various manners. For example, in some embodiments, method/apparatus of the embodiments can be implemented as hardware, software or a combination thereof. In some embodiments, method/apparatus of the embodiments can be implemented as client or lib or driver in the application server. In another embodiment, solution of the present disclosure can be implemented as integration of open-source software library and flash memory or further integrated with flash memory and application server as a hyper converged system (such as VCE product from EMC™), for instance, integrating application node of NoSQL database and a non-volatile storage device (e.g. XtremIO), or integrating application, client and storage together as a container.

Functions of elements of the apparatus shown in the drawings may be provided by hardware associated with the software, dedicated hardware and hardware associated with proper software and capable of executing software, or a firmware or a combination thereof. When it is provided by a processor, the function may be provided by a single dedicated processor, a single shared processor or a plurality of individual processors. Moreover, the term "processor" may include but not limited to digital signal processor (DSP) hardware, a network processor, application-specific integrated circuit (ASIC), field programmable gate array (FPGA), read only memory (ROM), random access memory (RAM) and non-volatile storage device for storing software. It may also include other common and/or customized hardware.

Those skilled in the art should appreciate that the specification and drawings only illustrate principles of the embodiments. Therefore, it should be understood that those skilled in the art can design various arrangements, which though not clearly described or shown, embody the principles of embodiments of the present disclosure and are included in the spirit and scope of embodiments of the present disclosure. In addition, all the examples are illustrated herein mainly for teaching purpose to facilitate readers in understanding principles of embodiments of the present disclosure and concepts contributed by the inventor to advance the field, and the embodiments should not be interpreted as limiting to examples and conditions elaborated herein. Meanwhile, all the statements describing principles, aspects and embodiments of the present disclosure also intend to include also their equivalents.

We claim:

1. A method for data storage, comprising:
obtaining description information for application data from an application, wherein the description information includes information about whether the application data is metadata;
performing storage optimization based on the description information;
omitting compression of the application data based on the description information indicating the application data is metadata;
performing at least part of a storage function to be implemented by a back-end storage cluster based on the description information, wherein the back-end storage cluster includes a flash cluster, wherein the at least part of the storage function to be implemented by the back-end storage cluster includes:
querying an abstract of the application data and returning, to a server, non-repetitive information relative to the abstract of the application data,
partitioning the application data, wherein partitioning the application data includes determining a target memory the partitioned data is to be sent to, wherein the target memory comprises one or more storage nodes, and
transmitting the partitioned application data to the identified one or more storage nodes;
performing path management of the data storage; and
informing a server, via the back-end storage cluster, of a change in one or more of the one or more storage nodes in an asynchronized manner, wherein the change in one or more of the one or more storage nodes includes adding or removing one or more of the one or more storage nodes.

2. The method according to claim 1, wherein the description information further includes at least one of:
information about whether the application data is hot data or cold data;
information about whether the application data is compressible or whether repetitive data can be deleted from the application data;
information about whether the application data is a data snapshot;
information about whether the application data has expired; and
information about whether the application data is garbage data.

3. The method according to claim 1, wherein obtaining description information for application data from an application comprises at least one of: obtaining the description information by querying an application program interface (API) of the application and by receiving an input/output request from the application.

4. The method according to claim 1, wherein performing the storage optimization comprises performing at least one of:
writing combining;
pre-reading;
non-uniform memory access (NUMA);
reduction of memory copies by execute-in-place (XIP) or zero copy;
prioritizing; and
caching for reading or writing.

5. The method according to claim 1, wherein the at least part of the storage function to be implemented by the back-end storage cluster includes at least one of:
obtaining an abstract of the application data using a security hash algorithm (SHA);
deleting a repetition;
compressing the application data; and
determining a target storage device to which the application data is to be transmitted;
transmitting the application data to the target storage device via remote direct memory access (RDMA).

6. The method according to claim 1, further comprising: transmitting the application data to the back-end storage cluster after performing the at least part of the storage function to be implemented by the back-end storage cluster.

7. The method according to claim 6, wherein transmitting the application data to the back-end storage cluster comprises: transmitting the application data to the back-end storage cluster via a network.

8. The method according to claim 1, wherein the back-end storage cluster is a non-volatile storage device.

9. The method according to claim 1, wherein the application includes at least one of a relational database (SQLDB), a non-relational database (NoSQL), a file system (FS), and a virtual machine (VM).

10. The method according to claim 1, further comprising performing at least one of the following managing operations:
monitoring the data storage; and
reporting a state of the data storage.

11. The method according to claim 1, wherein the method is implemented in the server running the application.

12. An apparatus for data storage, including one or more processors and one or more memories configured to perform operations, comprising:
obtaining description information for application data from an application, wherein the description information includes information about whether the application data is metadata, wherein the application is a third generation storage platform application;

performing storage optimization based on the description information;
omitting compression of the application data based on the description information indicating the application data is metadata;
performing at least part of a storage function to be implemented by a back-end storage device based on the description information, wherein the back-end storage device is comprised of at least one flash memory device, wherein the at least part of the storage function to be implemented by the back-end storage device includes:
querying an abstract of the application data and returning, to a server, non-repetitive information relative to the abstract of the application data,
partitioning the application data, wherein partitioning the application data includes determining a target memory the partitioned data is to be sent to, wherein the target memory comprises one or more storage nodes, and
transmitting the partitioned application data to the identified one or more storage nodes; and
performing path management of the data storage.

13. The apparatus according to claim 12, wherein the description information further includes at least one of:
information about whether the application data is hot data or cold data;
information about whether the application data is compressible or whether repetitive data can be deleted from the application data;
information about whether the application data is a data snapshot;
information about whether the application data has expired; and
information about whether the application data is garbage data.

14. The apparatus according to claim 12, wherein the description information is obtained by at least one of querying an application program interface (API) of the application and by receiving an input/output request from the application.

15. The apparatus according to claim 12, wherein performing the storage optimization includes at least one of:
writing combining;
pre-reading;
non-uniform memory access (NUMA);
reduction of memory copies by execute-in-place (XIP) or zero copy;
prioritizing; and
caching for reading or writing.

16. The apparatus according to claim 12, wherein the at least part of the storage function to be implemented by the back-end storage device includes at least one of:
obtaining an abstract of the application data using a security hash algorithm (SHA);
deleting a repetition;
compressing the application data;
determining a target storage device to which the application data is to be transmitted; and
transmitting the application data to the target storage device via remote direct memory access (RDMA).

17. The apparatus according to claim 12, further comprising transmitting the application data to the back-end storage device after performing the at least part of the storage function to be implemented by the back-end storage device.

18. The apparatus according to claim 17, wherein the application data is transmitted to the back-end storage device via a network.

19. The apparatus according to claim 12, wherein the application includes at least one of a relational database (SQLDB), a non-relational database (NoSQL), a file system (FS), and a virtual machine (VM).

20. The method according to claim 1, wherein the at least part of the storage function to be implemented by the back-end storage device includes:
generating a check code with a CRC algorithm.

21. The apparatus according to claim 12, wherein the at least part of the storage function to be implemented by the back-end storage device includes:
generating a check code with a CRC algorithm.

22. The method according to claim 1, wherein transmitting the application data includes transmitting the non-repetitive information directly from the server to the plurality of storage nodes.

* * * * *